(12) United States Patent
Sanchez

(10) Patent No.: US 8,777,073 B2
(45) Date of Patent: Jul. 15, 2014

(54) HEADREST HAT COAT HOOK HANGER

(76) Inventor: Roy C Sanchez, Las Vegas, NV (US)

(*) Notice: Subject to any disclaimer, the term of this patent is extended or adjusted under 35 U.S.C. 154(b) by 88 days.

(21) Appl. No.: 13/550,844

(22) Filed: Jul. 17, 2012

(65) Prior Publication Data

US 2014/0021230 A1    Jan. 23, 2014

(51) Int. Cl.
*B60R 7/04*    (2006.01)

(52) U.S. Cl.
USPC ............... 224/275; 296/37.15; 296/37.16; 296/24.34

(58) Field of Classification Search
CPC ............ B60R 7/04; B60R 7/043; B60R 7/08; B60R 11/00; B60R 99/00
USPC ............... 296/37.15, 37.1, 6, 24.34, 37.16; 224/275; D12/416
See application file for complete search history.

(56) References Cited

U.S. PATENT DOCUMENTS

| | | | | |
|---|---|---|---|---|
| 5,833,101 A * | 11/1998 | Watkins | | 224/275 |
| 5,984,347 A * | 11/1999 | Blanc-Rosset | | 280/727 |
| 6,439,443 B1 * | 8/2002 | Liao | | 224/275 |
| 8,100,305 B2 * | 1/2012 | Sun | | 224/275 |
| 8,220,764 B2 * | 7/2012 | Ziaylek | | 248/312 |
| 2001/0054632 A1 * | 12/2001 | Larsen et al. | | 224/275 |
| 2003/0150892 A1 * | 8/2003 | Hoe | | 224/275 |
| 2012/0006870 A1 * | 1/2012 | Proctor et al. | | 224/275 |

* cited by examiner

*Primary Examiner* — Brian D Nash

(57) ABSTRACT

A headrest hat hook hanger that mounts to the side of headrest post with a clamp bracket that stand up and holds the double hat coat hook on the side wall of the headrest to hang hats, caps, and coats from the side of the headrest seat inside a vehicle.

4 Claims, 2 Drawing Sheets

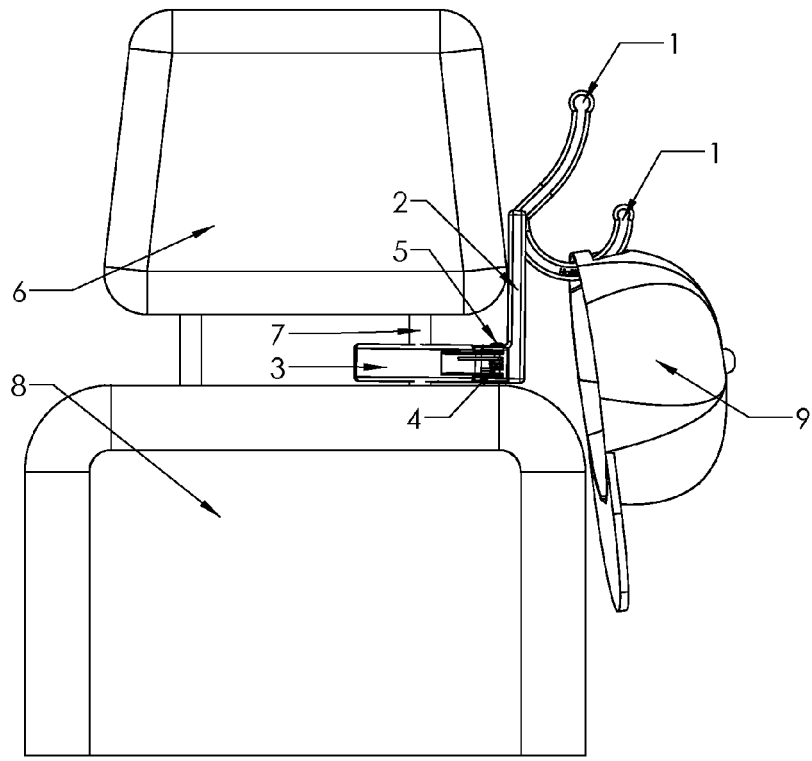
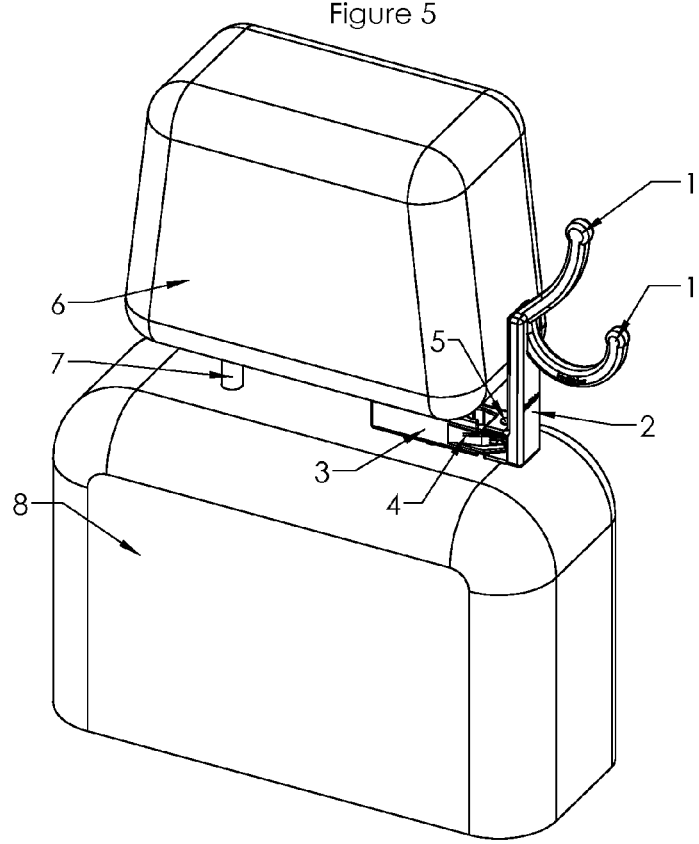

HEADREST HAT COAT HOOK HANGER

BACKGROUND OF THE INVENTION

There are different types of headrest hangers to hang garments inside a vehicle and some are bulky apparatus mostly that hang from the back of the seat where it is hard to reach. There are some headrest hanger that wrap around the headrest and others hang from the post. The problem is there are no hangers for hats that stand up on the side of the headrest where it is easy for the driver and passenger to reach.

SUMMARY OF THE INVENTION

The present invention is a headrest hanger apparatus that is mounted to the right side or left side of the headrest in which the advantage of the present invention is that the headrest hanger apparatus is used on the sides of the headrest where it is easy to reach and convenient to hang hats, caps, and coats. Another advantage of the apparatus it has a vertical stand bracket that holds up the headrest hanger apparatus along the right side and left side of the headrest. Another advantage of the apparatus is it has a universal clamp that mounts to any headrest post which automatically grip and adjust to each post position.

BRIEF DESCRIPTION OF THE DRAWINGS

FIG. 4 is a diagram of the headrest hanger apparatus mounted to a headrest seat with a hat.

FIG. 5 is a trimetric view of the headrest hanger apparatus mounted.

DETAILED DESCRIPTION OF THE PREFERRED EMBODIMENTS

Figure 1:
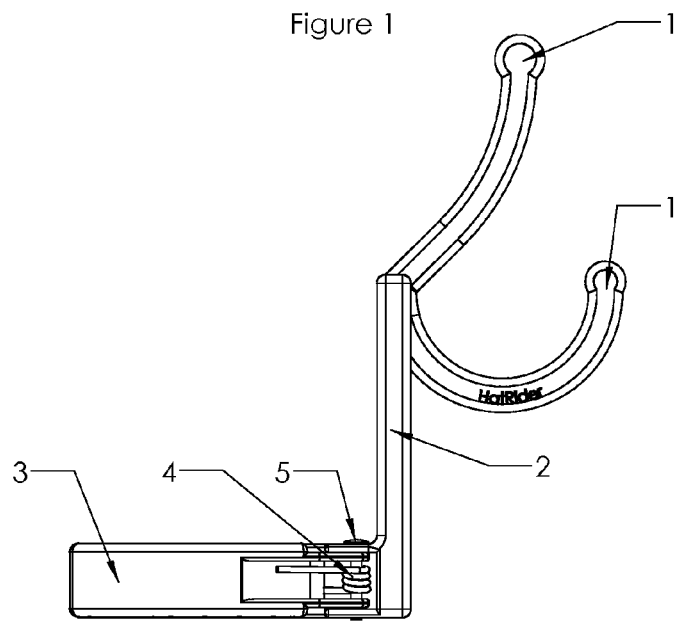
FIG. 1 is a side view diagram of the headrest hanger apparatus.

FIG. 1 is a side view diagram of the headrest hanger apparatus comprising of a double hook 1, vertical stand bracket 2, clamp 3, torsion spring 4, and tubular rivet 5. The clamp 3 is attached to the back of the vertical stand bracket 2 and the double hook 1 is attached to the front of the vertical stand bracket 2. The tubular rivet 5 inserts into the torsion spring 4 and becomes the hinge for the clamp 3 swing arm that can open and close. The clamp 3 attached to the bottom half of the vertical stand bracket 2 forms a perpendicular support bracket to hold the hanging hats and caps. The top of the vertical stand bracket 2 leads up to the double hook 1 where it has an elongated top prong hook and a curve hook below.

Figure 2:
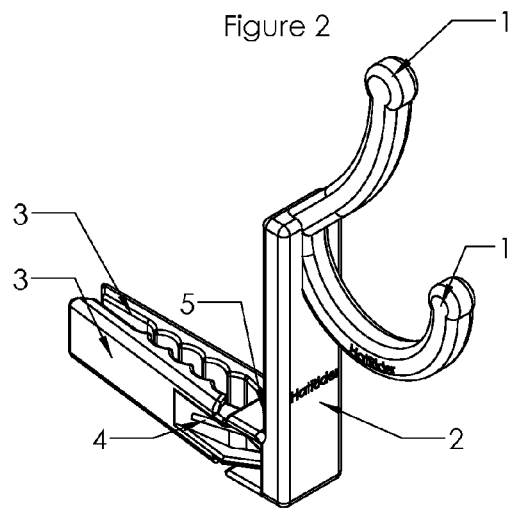
FIG. 2 is a trimetric view of the headrest hanger apparatus.

FIG. 2 is a trimetric view of the headrest hanger apparatus that clearly shows the double hook 1 attached to the vertical stand bracket 2 on the front side wherein the double hook 1 has an elongated curve prong hook at the top and a curve hook underneath it. The clamp 3 attached on the opposite side of the double hook 1 wherein the clamp 3 is use to mount around a post of a headrest.

Figure 3:
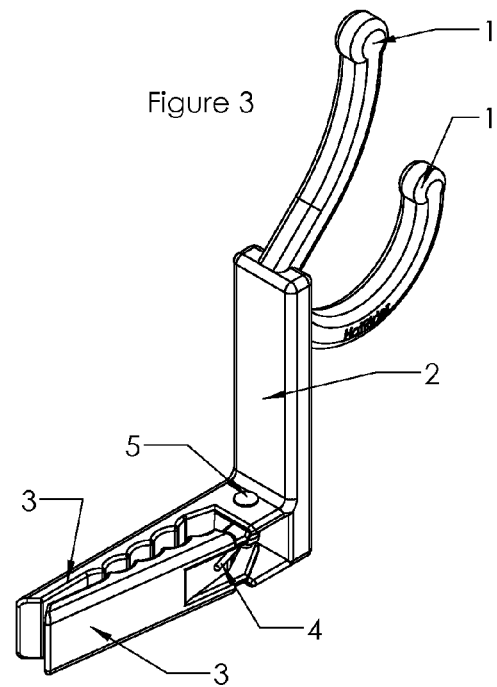
FIG. 3 is a back view of the headrest hanger apparatus.

FIG. 3 is a isometric back view of the headrest hanger apparatus comprising of a clamp 3 attached on the backside of the vertical stand bracket; wherein the clamp 3 is assembled with a torsion spring 4 and tubular rivet 5. The tubular rivet 5 acts as a hinge for the clamp 3 and the torsion spring 4 forces the mouth of the clamp 3 to close down. The torsion spring 4 provides grip force for the clamp 3. The inside of the clamp 3 has curve groves on the edge so it can wrap around the post and bite down.

FIG. 4 illustrates the preferred embodiment of the headrest hanger apparatus with the double hook 1 hanging a hat cap 9 from the right side of the headrest 6. The clamp 3 grips around the headrest post 7 and stands on the top edge of the backseat 8. The headrest hanger apparatus is made with a durable plastic material where the vertical stand bracket 2 attached to the double hook 1 can hang and hold the weight of many hat cap 9 on the side of the headrest 6.

FIG. 5 is a trimetric view of the preferred embodiment of the headrest hanger apparatus mounted onto the right side of the headrest 6. The mouth of the clamp 3 is pushed inward from the side of the headrest 6 around the headrest post 7 and the backside of the vertical stand bracket 2 is up against the side wall of the headrest 6. The double hook 1 stand up on the side of the headrest 6 and the clamp 3 sits on the top edge of the backseat 8. The headrest 6 can be pushed down onto the clamp 3 where the clamp 3 is sandwich between the headrest 6 and the edge of the backseat 8 to prevent the clamp 3 from moving so it always keeps the double hook 1 positioned on the side of the headrest 6.

The preferred embodiment of the headrest hanger apparatus can be adapted to any size and shape of hooks and can be made with different durable plastic material. The headrest hanger apparatus can hang and hold any types of hats, caps, and coats from the side of the headrest seat inside an automobile.

What is claimed is:

1. A headrest hanger apparatus to hang a hat a cap or a jacket on a headrest of an automobile seat comprising of: an elongated clamp; an arm stand; a hook; the hook directly attached to the arm stand; the arm stand attached perpendicular to the elongated clamp; the elongated clamp has two opposite sides that come together to mount to a side of a headrest post holding the headrest hanger apparatus beside the headrest; the elongated clamp further comprising: a torsion spring; a rivet; the two opposite sides of the elongated clamp facing together and forming a mouth; the elongated clamp has one side that swings open to slide a headrest post inside the mouth; the inside of the mouth formed by the elongated clamp has a set of grooves to fasten the headrest post into different positions; the torsion spring has an elongated spring leg attached on the two outer sides of the elongated clamp and the torsion spring keeps the mouth closed down around the headrest post; the elongated clamp is fastened together by a rivet and the rivet holds the torsion spring and the elongated clamp together.

2. The headrest hanger apparatus of claim 1, wherein the arm stand is perpendicular to the elongated clamp; the hook is attached to the top of the arm stand and the back of the arm stand is pushed up against the headrest.

3. The headrest hanger apparatus of claim 2, wherein the hook further comprising of a dual hook attached to the arm stand on the top front side; the dual hook comprised of an elongated curve hook at top half with a round end point and a curve J-shape hook underneath the elongated curve hook; the dual hook has a round end that can hang hats, caps, and coats.

4. The headrest hanger apparatus of claim 3, wherein the apparatus is made with a plastic material; the dual hook attaches to the arm stand; the arm stand holds the dual hook beside the headrest and the arm stand is attached perpendicular to the elongated clamp; the elongated clamp mounts to the headrest post and can be adjusted around the headrest post into a set of grooves inside the elongated clamp forming a headrest hook with an elongated clamp.

* * * * *